United States Patent
Kuznetsova et al.

(10) Patent No.: US 10,402,871 B2
(45) Date of Patent: *Sep. 3, 2019

(54) AUTOMATIC REVIEW EXCERPT EXTRACTION

(71) Applicant: Amazon Technologies, Inc., Seattle, WA (US)

(72) Inventors: Olga I. Kuznetsova, Seattle, WA (US); Logan Luyet Dillard, Seattle, WA (US); Jason Roselander, Luxembourg (LU); Terrence R. Nightingale, Marysville, WA (US); Brandon W. Porter, Auburn, WA (US)

(73) Assignee: Amazon Technologies, Inc., Seattle, WA (US)

( * ) Notice: Subject to any disclaimer, the term of this patent is extended or adjusted under 35 U.S.C. 154(b) by 383 days.

This patent is subject to a terminal disclaimer.

(21) Appl. No.: 15/214,761

(22) Filed: Jul. 20, 2016

(65) Prior Publication Data

US 2016/0328761 A1 Nov. 10, 2016

Related U.S. Application Data

(63) Continuation of application No. 12/893,598, filed on Sep. 29, 2010, now Pat. No. 9,405,825.

(51) Int. Cl.
*G06F 16/33* (2019.01)
*G06F 16/34* (2019.01)
(Continued)

(52) U.S. Cl.
CPC ....... *G06Q 30/0282* (2013.01); *G06F 16/334* (2019.01); *G06F 16/345* (2019.01); *G06F 16/9535* (2019.01)

(58) Field of Classification Search
CPC ............... G06Q 30/0282; G06Q 30/02; G06F 17/30675; G06F 17/30867;
(Continued)

(56) References Cited

U.S. PATENT DOCUMENTS 6,963,848 B1 11/2005 Brinkerhoff
8,117,207 B2 2/2012 Mushtaq et al.
(Continued)

OTHER PUBLICATIONS

Blei, David M.; Ng, Andrew Y.; Jordan, Michael I., "Latent Dirichlet Allocation," Journal of Machine Learning Research 3 (2003). Published Jan. 2003.

*Primary Examiner* — Albert M Phillips, III
(74) *Attorney, Agent, or Firm* — Thomas | Horstemeyer, LLP

(57) ABSTRACT

Disclosed are various embodiments for extracting an excerpt from a representative review of an item, such as an item available for purchase in an electronic commerce system. Attributes or categories used in reviews of an item may be identified and ranked according to consumer preference. Upon ranking the categories, an excerpt may be extracted from a review corresponding to a ranked one of the attributes or categories. The excerpt may be identified and extracted if a number of reviews for an item exceeds a threshold quantity as it may be impractical for a user to read every review written about the item.

20 Claims, 4 Drawing Sheets

(51) Int. Cl.
*G06Q 30/02* (2012.01)
*G06F 16/9535* (2019.01)

(58) Field of Classification Search
CPC ........... G06F 17/30719; G06F 16/9535; G06F 16/334; G06F 16/345
See application file for complete search history.

(56) References Cited

U.S. PATENT DOCUMENTS

| | | |
|---|---|---|
| 8,438,149 B1 | 5/2013 | Dicker |
| 2006/0129446 A1* | 6/2006 | Ruhl ................. G06F 17/30873 705/306 |
| 2007/0078671 A1 | 4/2007 | Dave et al. |
| 2007/0078699 A1 | 4/2007 | Scott et al. |
| 2008/0082499 A1 | 4/2008 | Koski |
| 2008/0249764 A1 | 10/2008 | Huang et al. |
| 2010/0169317 A1 | 7/2010 | Wang et al. |

* cited by examiner

AUTOMATIC REVIEW EXCERPT EXTRACTION

CROSS-REFERENCE TO RELATED APPLICATION

This application is a continuation of and claims priority to U.S. patent application Ser. No. 12/893,598, entitled "AUTOMATIC REVIEW EXCERPT EXTRACTION," now issued as U.S. Pat. No. 9,405,825, and filed on Sep. 29, 2010, which is incorporated herein by reference in its entirety.

BACKGROUND

Before purchasing an item in a marketplace, a potential customer may wish to research any reviews of the item to determine known advantages and disadvantages. The reviews written by prior purchasers of the item often provide useful information to help customers make educated decisions regarding whether to purchase items. However, if there are a large number of reviews, then it may be difficult for customers to obtain useful information from such reviews, especially if the opinions expressed in such reviews are diverse.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to extracting at least one representative review excerpt from a plurality of reviews associated with an item available for sale in an electronic commerce system based at least in part upon the subject matter of the reviews and/or consumer preferences. In the following discussion, a general description of the system and its components is provided, followed by a discussion of the operation of the same.

Figure 1:
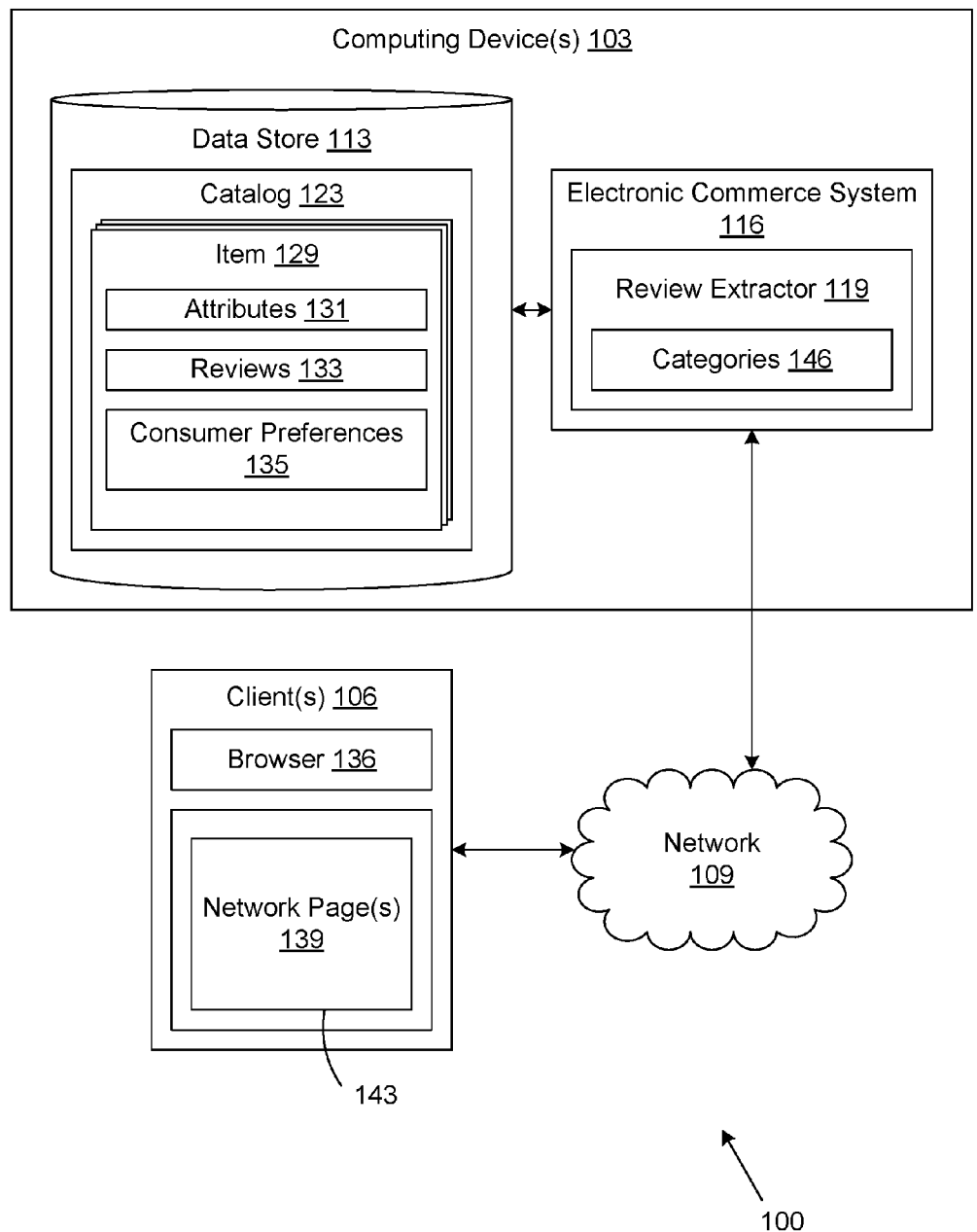
FIG. 1 is a drawing of a networked environment according to various embodiments of the present disclosure.

With reference to FIG. 1, shown is a networked environment 100 according to various embodiments. The networked environment 100 includes a computing device 103, a client 106, and a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements, as described above.

Various applications and/or other functionality may be executed in the computing device 103 according to various embodiments. Also, various data is stored in a data store 113 that is accessible to the computing device 103. The data store 113 may be representative of a plurality of data stores, as can be appreciated. The data stored in the data store 113, for example, is associated with the operation of the various applications and/or functional entities described below.

The components executed on the computing device 103, for example, include an electronic commerce system 116, and other applications, services, processes, systems, engines, or functionality not discussed in detail herein. The electronic commerce system 116 includes various components such as a review extractor 119, and other applications and processes.

The electronic commerce system 116 is executed in order to facilitate the online purchase of products over the network 109. The electronic commerce system 116 also performs various back-end functions associated with the online presence of a merchant in order to facilitate the online purchase of products. For example, the electronic commerce system 116 generates network pages 139 such as web pages or other types of network content that are provided to clients 106 for the purpose of selecting products for purchase, rental, download, lease, or other form of consumption, as will be described. Additionally, the review extractor 119 is configured to extract a representative review excerpt for the customer based on the subject matter appearing in the reviews 133 and customer preferences.

The data stored in the data store 113 may be gathered from a variety of data sources such as formal product data, product categorization data, manufacturer descriptions, blogs, discussion forums, and/or any other type of data source. Further, the reviews 133 may originate from any other type of structured, unstructured, and/or semi-structured data source. An example of this data is a catalog 123 that includes a list of items 129. Associated with each item 129 is item information that may comprise, for example, information about an item 129 such as images, text, and other information. Also associated with each item 129 are attributes 131, reviews 133, and other information. Further associated with each item 129 in the catalog 123 are consumer preferences 135. A unique item identifier is assigned to each of the items 129 in the catalog 123. The unique item identifiers are referenced by the electronic commerce system 116 to facilitate purchase of such items 129. The reviews 133 represent all of the available reviews that are associated with the item 129 written by other users in the electronic commerce system 116. The attributes 131 represent a list of features or qualities associated with an item 129 that describe the item 129 and that may be presented to customers when they view an item 129 in a respective network page, as will be described. The consumer preferences 135 represent data indicating an order of consumer preference of the attributes contained in the attributes 131. In one embodiment, the ranking of consumer preferences 135 may be gathered by the electronic commerce system 116 by examining purchase histories of customers, browse histories of customers, survey evidence, statistical analysis, and/or other methods. Further, in one embodiment, the data may be gathered at a time of purchase, at a time after the consumer has used the item 129 for a threshold period of time, and/or any other time before or after the purchase. Additionally, the consumer preferences 135, attributes 131 and reviews 133 may be updated on a periodic basis.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client 106 may be configured to execute various applications such as a browser 136 and/or other applications. The browser 136 may be executed in a client 106, for example, to access and render network pages 139, such as web pages, or other network content served up by the computing device 103 and/or other servers. Further, the browser 136 may also be executed to render the network page 139 on a display screen 143. The client 106 may be configured to execute applications beyond browser 136 such as, for example, email applications, instant message applications, and/or other applications.

Next, a general description of the operation of the various components of the networked environment 100 is provided. To begin, a user interacts with the electronic commerce system 116 on the client 106 via the network 109 to shop and/or browse for a plurality of items 129 to make a purchase. In one embodiment, the user interacts with the electronic commerce system 116 using the browser 136 on the client 106. From time to time, a user may be browsing through various items 129 offered for sale and/or rent through the electronic commerce system 116. As the user views various items 129, the electronic commerce system 116 may provide reviews of the item 129 along with the detailed information of the item 129, such as, for instance, attributes and pricing for the item 129. The user may read the reviews 133 to obtain an opinion about the item 129 written by other users before making a decision on whether to purchase that particular item 129.

In one embodiment, the number of reviews 133 provided by the electronic commerce system 116 may exceed a threshold quantity such that it becomes impractical for a user to read every review 133 written about the item 129. In such a situation, the review extractor 119 is configured to examine all of the reviews 133 to extract at least one representative review excerpt that may be presented to the user. The review extractor 119 extracts at least one representative review excerpt from all of the reviews 133 associated with the item 129 based at least in part on categories 146 generated from the reviews 133 and the consumer preferences 135.

In one embodiment, the review extractor 119 identifies the item 129 being displayed to the user in the electronic commerce system 116 and gathers the corresponding reviews 133 associated with the item 129 from the data store 113. The review extractor 119 then examines the reviews 133 and associates each of the reviews 133 with at least one category 146. The categories 146 may be defined based on the attributes 131 associated with the item 129. For example, if the item 129 is a laptop computer, then the attributes 131 associated with the laptop computer may include processor, RAM, screen size, hard drive, graphics card, weight, operating system, price, and/or any other attributes appearing in a catalog offering the item 129 for sale and/or rent.

As an example, the review extractor 119 associates each of the reviews 133 with at least one of the attributes 131. In particular, the review extractor 119 may parse each of the reviews 133 associated with the laptop computer and associate each review 133 with one of the attributes 131 based on the subject matter contained in the review 133. That is to say, in one embodiment, the categories 146 may be substantially similar to the attributes 131. Further, each review 133 may be associated with at least one of the attributes 131 discussed in the subject matter of the review 133. Additionally, each review 133 may be associated with more than one of the attributes 131 if more than one attribute is mentioned in the subject matter of the review 133.

In another embodiment, the categories 146 may be determined based on a common lexicon appearing in the reviews 133. For instance, the common lexicon may comprise a plurality of words and/or a plurality of phrases that appear in the reviews 133 above a threshold frequency. A number of occurrences of a lexicon are first identified by the review extractor 119 by parsing the words and/or phrases appearing in each of the reviews 133. The review extractor 119 then associates each review 133 with at least one of the categories 146, where each category 146 is defined according to a corresponding common lexicon. In one embodiment, the common lexicon may be identified by a plurality of clustering techniques, such as, for example, hierarchical algorithms, partitional algorithms, density-based algorithms, and/or any other type of clustering technique. Further, in yet another embodiment, the common lexicon may be identified by determining high-value words and/or phrases. For instance, a word and/or phrase may be marked as "high-value" if they appear in the reviews 133 a threshold number of times.

Upon associating the reviews 133 with at least one of the categories 146, then according to one embodiment, the review extractor 119 ranks the categories 146 based at least in part upon consumer preferences 135. For instance, the consumer preferences 135 may indicate a ranking of the attributes 131 associated with the item 129. The ranking identifies which of the attributes 131 are more important to a consumer relative to the other attributes 131 associated with the item 129. Specifically, consumers may consider the processor speed to be the most important attribute of a laptop computer, followed by RAM and hard drive space, in that order. The data contained in consumer preferences 135 may present these attributes as a hierarchy having processor, RAM and hard drive space as the rank order. Given these preferences, the review extractor 119 ranks the categories 146 to reflect these consumer preferences 135. Thus, in the above example, the reviews 133 associated with the processor will be ranked higher than the reviews 133 associated with the RAM and the hard drive space.

Having ranked the categories 146, the review extractor 119 may then rank the reviews 133 associated with each of the categories 146 according to a rating assigned for each review 133. For instance, each review 133 may have been assigned a score based on the usefulness of that review 133. In one example, usefulness of the review 133 may be determined by a quality of the review 133, where a review 133 of higher quality may be assigned more stars than a review 133 of lower quality. Other examples of ratings include a numerical rating, a letter grade, and/or any other form of rating. In one embodiment, the review extractor 119 may also associate the reviews 133 with each of the categories 146 in a random order.

Next, the review extractor 119 then extracts at least one representative review excerpt from the ranked one of the reviews 133 associated with the categories 146. In one embodiment, the review extractor 119 may determine which category 146 has the most number of reviews 133 associated with it and may use one of those reviews 133 to extract a representative review excerpt. For instance, the review extractor 119 may determine that most of the reviews 133 discuss "processor" and since processor is the highest preference as indicated by the consumer preferences 135, the review extractor 119 may extract a representative review excerpt from one of the reviews 133 found to be associated with the "processor" category 146. The review extractor 119 may extract a predetermined number of words appearing before and after the word "processor" to serve as the representative review excerpt. As another example, the review extractor 119 may determine that nearly all of the reviews 133 discuss "RAM" and since the RAM is the second highest preference as indicated by the consumer preferences 135, the review extractor may extract from one of the reviews 133 found to be associated with the "RAM" category 146.

In another embodiment, the review extractor 119 may correlate the number of reviews 133 associated with each category 146 with the respective ranking of the category 146 as indicated by the consumer preference 135 to extract a representative review excerpt. For example, a situation may arise where the most discussed attribute 131 appearing in each of the reviews 133 is a low ranking attribute 131 as indicated by the consumer preferences 135, such as, for example, an operating system installed on a laptop computer. However, the review extractor 119 may extract a representative review excerpt associated with the "operating system" category 146 even though operating system is not a high ranking consumer preference 135. In one embodiment, the review extractor 119 may extract a review 133 from a lower ranking consumer preference 135 as the representative review excerpt if the number of reviews 133 associated with the lower ranked consumer preference 135 exceeds the number of reviews 133 associated with a higher ranked consumer preference 135 by a threshold amount.

That is to say, in extracting a representative review excerpt, the review extractor 119 compares the number of reviews 133 for category 146 relative to the other categories 146 and correlates this comparison with the ranking of the attributes 131 as indicated by the consumer preference 135. For example, in one embodiment, the order of consumer preferences 135 may be processor, RAM and operating system, where processor is the highest ranked category 146 and operating system is the lowest ranked category 146, as described above. Further in this example, the number of reviews 133 associated with each of these categories 146 may differ where the operating system has the most number of reviews 133, RAM has the second most number of reviews 133, and processor has the least number of reviews 133, relative to each other.

To extract a representative review excerpt, the review extractor 119 determines the difference in the number of reviews 133 associated with the operating system category 146 and the number of reviews 133 associated with each of the other categories 146. For instance, the review extractor 119 may determine that there may be 500 more reviews 133 associated with the operating system category 146 than the processor category 146, and 250 more reviews 133 associated with the operating system category 146 than the RAM category 146. If the difference in the number of reviews 133 associated with the operating system category 146 and the number of reviews 133 associated with the processor category 146 exceeds a threshold number, then the review extractor 119 extracts a representative review excerpt from one of the reviews 133 associated with the operating system category 146. Further, the review extractor 119 performs the same analysis described above when selecting a review 133 between the operating system and the RAM categories 146. Still further, the review extractor 119 performs the same analysis, comparing the number of reviews 133 associated with the RAM category 146 and the number of reviews 133 associated with the processor category 146.

In another embodiment, the threshold number used for comparing the number of reviews 133 between the categories 146 varies depending on the ranking of the category 146 as indicated by the consumer preferences 135. In the above example, the threshold number may differ when determining the difference in the reviews 133 associated with the operating system category 146 and the processor category 146 and when determining the difference in the reviews 133 associated with the operating system category 146 and the RAM category 146. For instance, the threshold number when comparing the number of reviews 133 between two categories 146 increases as the difference in ranking indicated by the consumer preference 135 between those two categories 146 increases. Similarly, the threshold number when comparing the number of reviews 133 between two categories 146 decreases as the difference in ranking indicated by the consumer preference 135 between those two categories 146 decreases. In one embodiment, the difference in the threshold number may have a direct relationship with the difference in the ranking indicated by the consumer preferences 135.

In another embodiment, the review extractor 119 may determine which category 146 is associated with most number of highest quality of reviews 133. For example, the review extractor 119 may calculate the percentage of high quality reviews 133 for each of the categories 146 to make this determination. To this end, the review extractor 119 may use a review quality rating associated with each review 133 to calculate the percentage of high quality reviews 133. This review quality rating is indicative of a quality of the review 133. Each review quality rating may be generated based at least in part upon inputs received from consumers who have read the reviews 133. For example, various components may be presented and manipulated by consumers to indicate whether they found a given review 133 to be helpful. The review quality ratings may be generated based on such inputs or in some other manner. For instance, the rating may be a star rating and the review extractor 119 may determine that a rating of at least four stars is a high quality review 133. Having determined the category 146 from which to extract at least one representative review excerpt, the review extractor 119 then selects at least one review 133 associated with the category 146. For example, the review extractor 119 may select at least one review 133 at random, based on the rating, and/or any other way of selecting a review.

In a further embodiment, the review extractor 119 may extract a representative review excerpt for each of, or multiple ones of, the categories 146. To this end, the review extractor 119 may extract at least one representative review excerpt for each of the categories 146. In another embodiment, the review extractor 119 may extract at least one representative review excerpt for the higher ranking categories 146 as determined by the consumer preferences 135. In yet another embodiment, the review extractor 119 may extract at least one representative review excerpt from every category 146 that is associated with a threshold percentage of higher quality reviews 133. For example, the review extractor 119 may determine all of the categories 146 associated with at least a threshold percentage of higher quality reviews 133 and then select at least one review 133 associated with each of these categories 146 from which to extract a representative review excerpt.

In yet another embodiment, the review extractor 119 may generate the representative review excerpt from at least one of the selected reviews 133 based at least in part on a semantic analysis of the selected review 133. For instance, the review extractor 119 may utilize one of many well-known approaches for semantic meaning extraction to generate at least one of the representative review excerpts. As one example, the review extractor 119 may use latent dirichlet allocation, latent semantic indexing, probabilistic latent semantic indexing, and/or other types of topic models for discovering topics that occur in the reviews 133. Using one of these well-known techniques, the review extractor 119 may analyze all of the reviews 133 associated with at least one of the selected categories 146 and use the results of the semantic analysis to generate at least one representative review excerpt. Additional approaches for semantic meaning extraction are described in U.S. Patent Application entitled "Generating Item Recommendations," filed on Sep. 18, 2009, and assigned patent application Ser. No. 12/562,759, which is incorporated by reference herein in its entirety.

In still another embodiment, the review extractor 119 may generate one or more "pro" representative review excerpts and one or more "con" representative review excerpts. For instance, a pro representative review excerpt may be extracted from one or more reviews 133 expressing a favorable opinion about the item 129. Similarly, a con representative review excerpt may be extracted from one or more reviews 133 expressing an unfavorable opinion about the item 129.

As one example, an item rating may be associated with each item 129 that, for instance, indicates a quality of the item 129 and/or a consumer satisfaction of the item 129. Such item ratings may be expressed as a star rating, a numerical rating, a letter rating, and/or any other type of rating and are generated based on feedback from users who may also generate reviews 133 of respective items 129. For example, the item rating may be expressed on a numerical scale, where an item rating that is less than or equal to a predefined lower threshold is presumed to indicate customer dissatisfaction or other negative sentiment with respect to the item 129. Conversely, an item rating that is greater than or equal to a predefined higher threshold is presumed to indicate customer satisfaction or other positive sentiment with respect to the item 129. For example, assume that an item rating can range from 1 to 10. In this example, the predefined lower threshold might be specified as 3, and the predefined higher threshold might be specified as 8. The middle range may be deemed to express a neutral sentiment.

In one embodiment, the review extractor 119 identifies all reviews 133 for an item 129 that are below or equal to the predefined lower threshold and all of the reviews 133 for an item 129 having an item rating that is above or equal to the predefined higher threshold. The review extractor 119 then extracts one or more "con" representative review excerpts from those reviews having an item rating less than or equal to the predefined lower threshold. Similarly, the review extractor 119 then extracts one or more "pro" representative review excerpts from those reviews having an item rating greater than or equal to the predefined higher threshold.

The excerpts may be extracted using any one or more of the approaches described above. To continue the above example, the review extractor 119 may extract "con" representative review excerpts from reviews having a review quality rating of less than or equal to 3, and "pro" representative review excerpts from reviews having a review quality rating of greater than or equal to 8.

As another example, the item rating may be expressed by a star rating where the predefined lower and higher thresholds mentioned above may comprise predefined numbers of stars (e.g. 2 or 4 stars). In another embodiment, well-known approaches for semantic meaning extraction, as described above, may also be used to determine whether a review 133 expresses a favorable and/or unfavorable opinion about the item 129.

Figure 2:
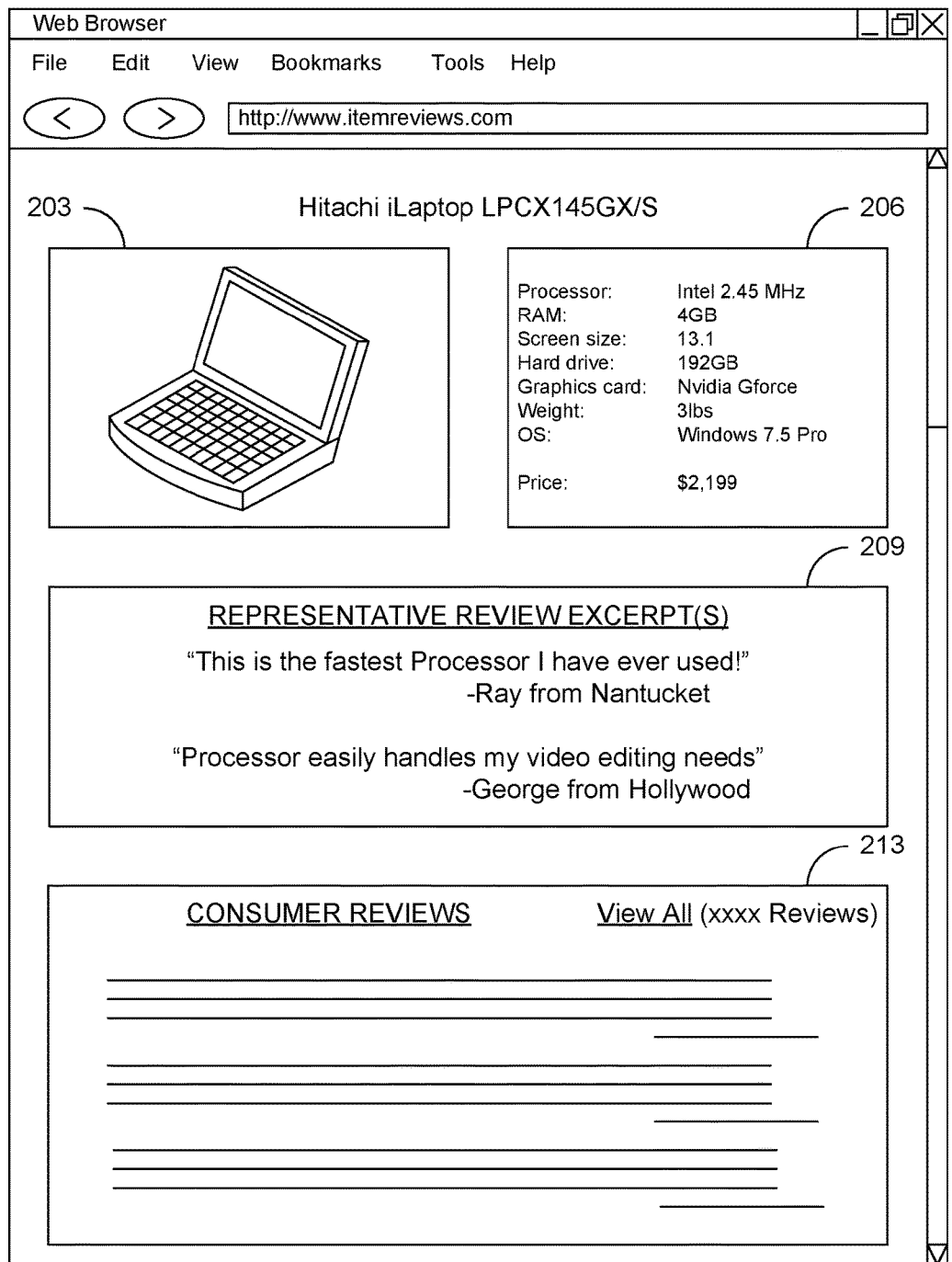
FIG. 2 is a drawing of an example of a user interface rendered by a client in the networked environment of FIG. 1 according to various embodiments of the present disclosure.

Referring next to FIG. 2, shown is an example of a rendered network page 139 (FIG. 1) according to various embodiments of the present disclosure. The various graphical components such as the blocks comprising different information shown in FIG. 2 are merely examples of the various types of features that may be used to accomplish the specific functions noted. In this embodiment, shown is a network page 139, denoted herein as network page 139a, that may be viewed on client 106 (FIG. 1) according to various embodiments.

In one embodiment, the network page 139a may include an item image 203, a catalog attributes box 206, a representative review excerpt box 209, and a reviews box 213. The item image 203 displays an item 129 (FIG. 1) that is offered for purchase by the electronic commerce system 116 (FIG. 1). For instance, the item 129 featured in item image 203 may be a book, a movie, an article of clothing, an electronic product, and/or any other type of item 129. In this example, the item 129 being depicted in item image 203 is a laptop computer. The catalog attributes box 206 depicts detailed information related to the item 129 depicted in item image 203 such as attributes 131 (FIG. 1) about the item 129 that may appear in a catalog. In this example, the catalog attributes for the laptop computer include the processor, RAM, screen size, hard drive size, type of graphics card, weight, type of operating system and the price. The representative review excerpt box 209 depicts at least one representative review excerpt extracted from the reviews 133 (FIG. 1) by the review extractor 119 (FIG. 1). In one embodiment, the representative review excerpt box 209 may only appear on the network page 139a if the total number of reviews 133 written about the item 129 in item image 203 exceeds a threshold number. In this example, the representative review excerpt box 209 depicts two different representative review excerpts. Finally, the reviews box 213 depicts all of the reviews 133 written by other users about the item 129 being depicted in item image 203. In this example, there are a total of xxxx reviews written about the laptop where the xxxx represents a predetermined number.

Figure 3:
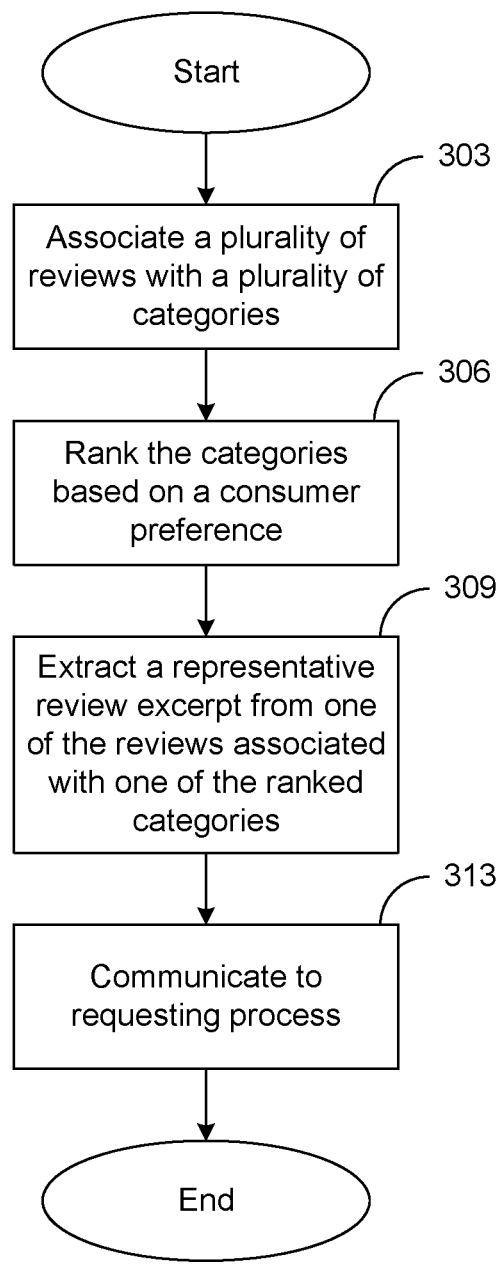
FIG. 3 is a flowchart illustrating one example of functionality implemented as portions of a review extractor executed in a computing device in the networked environment of FIG. 1 according to various embodiments of the present disclosure.

Referring next to FIG. 3, shown is a flowchart that provides one example of the operation of a portion of the review extractor 119 (FIG. 1) according to various embodiments. It is understood that the flowchart of FIG. 3 provides merely an example of the many different types of functional arrangements that may be employed to implement the operation of the portion of the review extractor 119, as described herein. As an alternative, the flowchart of FIG. 3 may be viewed as depicting an example of steps of a method implemented in the computing device 103 (FIG. 1) according to one or more embodiments.

According to one embodiment, the review extractor 119 is a process that extracts a representative review excerpt from the reviews 133 (FIG. 1) based on attributes 131 (FIG. 1) and consumer preferences 135 (FIG. 1) associated with an item 129. The review extractor 119 is configured to respond to a request for a representative review excerpt from a requesting process. For example, a requesting process may be a process that is generating a network page 139 (FIG. 1) to present one or more items 129 to a user for possible purchase and/or a process that is presenting a network page 139 that presents an item 129 in some other manner.

Beginning with box 303, the review extractor 119 associates a plurality of reviews 133 with a plurality of categories 146 (FIG. 1). In one embodiment, the review extractor 119 associates each of the reviews 133 with one or more categories 146 by using attributes 131. In particular, the attributes 131 may represent a set of features associated with the item 129 available for sale. In another embodiment, the review extractor 119 may identify a common lexicon appearing in the reviews 133 to use as the categories 146, as discussed above. For example, the review extractor 119 may use a plurality of clustering techniques to identify the common lexicons, such as, for instance, hierarchical algorithms, partitional algorithms, density-based algorithms, and/or any other type of clustering technique.

Further, having identified the categories 146, the review extractor 119 associates each of the reviews 133 with one or more categories 146 based on the subject matter appearing in the review 133. For example, using the example described above, if the item 129 available for sale is a laptop computer, then the attributes 131 associated with this item 129 may comprise the processor, RAM, screen size, hard drive, graphics card, weight, operating system, price and/or any other type of attribute 131. The review extractor 119 determines the attribute 131 being discussed in each of the reviews 133 and associates each review 133 with one or more of the above-identified categories 146.

Having associated the reviews 133 with one or more of the categories 146, the review extractor 119 then ranks the categories 146 based on a consumer preference 135, as shown in box 306. In one embodiment, the review extractor 119 gathers the ranking of preferences from the data contained in the consumer preference 135 and ranks the categories 146 accordingly. Using the above example, the order of consumer preferences may be processor, RAM and operating system, where a high-quality processor is the most preferred attribute 131, and then followed by the RAM and operating system, respectively. Abiding by this ranking of consumer preferences 135, the review extractor 119 ranks the processor category 146 to be higher than the RAM and operating system categories 146. Further, the review extractor 119 ranks the RAM category 146 to be higher than the operating system category 146, and so on.

Next, in box 309, the review extractor 119 extracts at least one representative review excerpt from one of the reviews 133 associated with each of the ranked categories 146. In one embodiment, the review extractor 119 determines the category 146 having the most number of reviews 133 associated therewith, and uses one of those reviews 133 to extract a representative review excerpt. In another embodiment, the review extractor 119 correlates the number of reviews 133 associated with each category 146 with the ranking indicated by the consumer preferences 135. For example, the review extractor 119 may determine that the most number of reviews 133 are associated with the processor category 146, where the processor category 146 is the highest ranked consumer preference 135. In this example, the review extractor 119 may extract a representative review excerpt from one of the reviews 133 associated with the "processor" category 146. For instance, the review extractor 119 may extract a predetermined number of words appearing before and after a given attribute 131 or lexicon such as the word "processor" or the phrase "fastest processor," etc.

In another embodiment, the review extractor 119 may determine that the most number of reviews 133 are associated with the operating system category 146. In this example, the operating system may be a low ranking attribute 131 as indicated by the consumer preference 135. As a result, the review extractor 119 compares the number of reviews 133 associated with the categories 146 ranked higher than the operating system with the total number of reviews 133 associated with the operating system category 146. If the difference in the number of reviews 133 exceeds a threshold number, the review extractor 119 extracts a review excerpt associated with the "operating system" category 146. In one embodiment, the threshold number used in the comparison may vary depending on the ranking of categories 146 as indicated by the consumer preference 135. For example, the threshold number may increase as the difference in ranking of the categories 146 increases, as described above. Once at least one representative review excerpt is extracted, the review extractor 119 communicates this review to a requesting process, as shown in box 313.

Further, in another embodiment, the review extractor 119 extracts at least one representative review excerpt by selecting at least one review 133 associated with the selected category 146 based at least on the rating, as described above. For instance, the review extractor 119 selects at least one review 133 based at least on the number of stars associated with that review. A higher number of stars may indicate a higher quality review 133. In yet another embodiment, the review extractor 119 extracts at least one representative review by using any well-known semantic meaning extraction techniques. For instance, the review extractor 119 may use a latent dirichlet allocation to generate a semantic meaning for all of the reviews 133 associated with the selected category 146. Further, the review extractor 119 may then use the result of the algorithm to be the representative review excerpt, as described above.

Additionally, in yet another embodiment, the review extractor 119 extracts one or more pro representative review excerpts and one or more con representative review excerpts. For example, the pro representative review excerpt is generated from reviews 133 expressing favorable opinions about the item 129 and the con representative review excerpt is generated from reviews 133 expressing unfavorable opinions about the item 129 as discussed above. The review extractor 119 may determine the favorability and/or unfavorability of the review 133 based on an item rating. For example, the item rating may be expressed on a numerical scale, a star rating, a letter grade, and/or any other form of expressed ratings. Further, the item rating may be assigned by a reviewer generating a review 133, as described above.

In one embodiment, the item rating may be expressed one a numerical scale where an item rating below a predefined lower threshold number indicates customer dissatisfaction or other negative sentiment with respect to the item 129, and an item rating above a predefined higher threshold number indicates customer satisfaction or other positive sentiment with respect to the item 129, as described above. For example, the review extractor 119 may extract a pro representative review excerpt from reviews 133 associated an item rating from 1-3 and a con representative review excerpt from reviews 133 associated an item rating from 8-10, where an item rating may range from 1-10 as described above. In another embodiment, the review extractor 119 extracts one or more pro representative review excerpts and one or more con representative review excerpts using well-known approaches for semantic meaning extraction, as described above.

Figure 4:
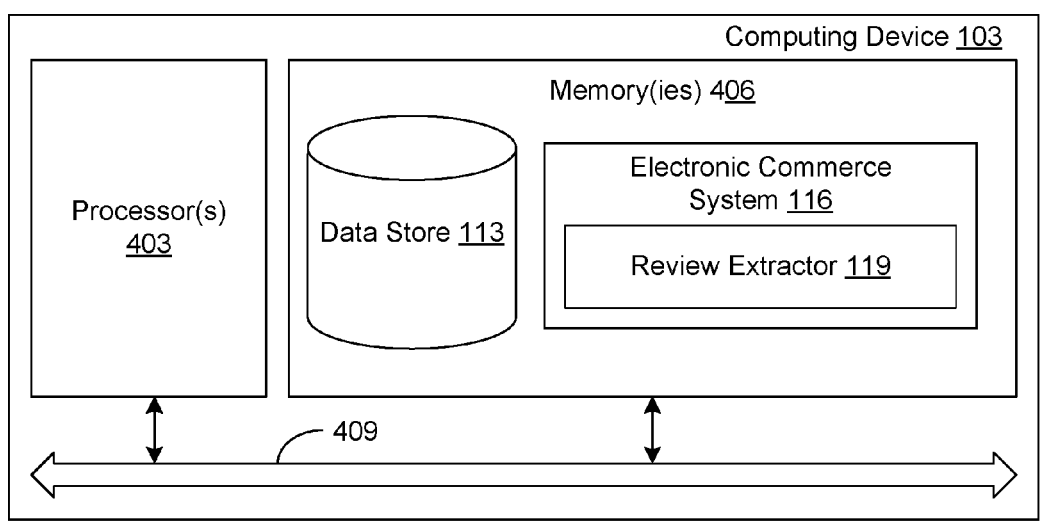
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the electronic commerce system 116, the review extractor 119, and potentially other applications. Also stored in the memory 406 may be a data store 113 and other data. In addition, an operating system may be stored in the memory 406 and executable by the processor 403.

It is understood that there may be other applications that are stored in the memory 406 and are executable by the processors 403, as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 109 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the electronic commerce system 116, the review extractor 119, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 4 shows the functionality and operation of an implementation of portions of the review extractor 119. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 116 and the review extractor 119, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying program code executable in at least one computing device that, when executed by the at least one computing device, causes the at least one computing device to:
identify a plurality of high-quality reviews from a plurality of reviews made for an item available in an electronic commerce system, the plurality of high-quality reviews being identified from the plurality of reviews based at least in part on a score generated for individual ones of the plurality of high-quality reviews;
identify a plurality of attributes of the item mentioned in the plurality of high-quality reviews;
associate individual ones of the plurality of attributes with at least one of a plurality of categories;
generate a consumer preference metric for individual ones of the plurality of categories based at least in part on a purchase history or a browse history associated with the item;
determine a ranking of consumer preference of the plurality of categories based at least in part on the consumer preference metric generated for the individual ones of the plurality of categories;
identify one of the plurality of categories from the ranking of consumer preference, the one of the plurality of categories identified as being associated with a respective lexicon appearing more frequently in the plurality of high-quality reviews than a higher-ranked one of the plurality of categories in the ranking;
extract an excerpt from at least one of the plurality of high-quality reviews corresponding to the one of the plurality of categories identified from the ranking of consumer preference; and
generate user interface data that includes the excerpt for rendering a user interface on a display of a client device.

2. The non-transitory computer-readable medium of claim 1, wherein the score generated for the individual ones of the plurality of high-quality reviews is generated based at least in part on a usefulness metric provided in association with the individual ones of the plurality of high-quality reviews.

3. The non-transitory computer-readable medium of claim 1, wherein the consumer preference metric for the individual ones of the plurality of categories is generated based at least in part on survey evidence obtained in association with the item.

4. The non-transitory computer-readable medium of claim 1, wherein the user interface data comprises code used to render a network page for the item on the display of the client device.

5. The non-transitory computer-readable medium of claim 1, wherein at least one of the plurality of attributes is a weight of the item; a physical characteristic of the item; a performance characteristic of the item; or a price for the item.

6. A system, comprising:
at least one computing device; and
program instructions executable in the at least one computing device that, when executed by the at least one computing device, cause the at least one computing device to:
receive a request for a network page associated with an item;
identify that a number of a plurality of reviews for the item exceeds a threshold quantity;
in response to the number of the plurality of reviews for the item having exceeded the threshold quantity, identify an excerpt from at least one of the plurality of reviews being representative of at least a portion of the plurality of reviews by:
identifying a plurality of categories from the plurality of reviews based at least in part in a common lexicon having a number of instances in the plurality of reviews exceeding a predefined threshold;
determining a ranking of the plurality of categories based at least in part on a consumer preference generated for individual ones of the plurality of categories; and
identifying one of the plurality of categories from the ranking, the one of the plurality of categories identified as being associated with a respective lexicon appearing more frequently in the plurality of reviews than a higher-ranked one of the plurality of categories in the ranking;
obtaining the excerpt from at least one of the plurality of reviews corresponding to the one of the plurality of categories identified from the ranking; and
generate the network page that comprises the excerpt for rendering on a client device.

7. The system of claim 6, wherein the common lexicon is identified by the at least one computing device using a clustering technique that comprises at least one of: a hierarchical algorithm, a partitional algorithm, or a density-based algorithm.

8. The system of claim 6, wherein the excerpt is obtained from the at least one of the plurality of reviews by:
identifying a subset of the plurality of reviews corresponding to the one of the plurality of categories identified from the ranking;
ranking the plurality of reviews in the subset based at least in part on an assigned rating; and
obtaining the excerpt from a highly-ranked one of the plurality of reviews.

9. The system of claim 8, wherein the assigned rating comprises a numerical rating or a letter grade provided by at least one user of an electronic commerce system.

10. The system of claim 6, wherein the consumer preference is determined based at least in part on a number of uses of the common lexicon appearing in the plurality of reviews.

11. The system of claim 6, wherein the excerpt is obtained from the at least one of the plurality of reviews by:
identifying a first set of words appearing before the common lexicon in the at least one of the plurality of reviews;
identifying a second set of words appearing after the common lexicon in the at least one of the plurality of reviews; and
extracting the first set of words, the common lexicon, and the second set of words from the at least one of the plurality of reviews.

12. A method, comprising:
receiving, via at least one of one or more computing devices, a request for a user interface associated with an item;
identifying, via at least one of the one or more computing devices, a representative review excerpt from at least one of a plurality of reviews for the item by:
identifying a plurality of attributes having a frequency of appearance in the plurality of reviews exceeding a predefined threshold;
associating individual ones of the plurality of attributes with at least one of a plurality of categories;
determining a ranking of the plurality of categories based at least in part on a consumer preference generated for individual ones of the plurality of categories;
identifying one of the plurality of categories from the ranking, the one of the plurality of categories identified as being associated with a respective lexicon appearing more frequently in the plurality of reviews than a higher-ranked one of the plurality of categories in the ranking; and
applying a semantic analysis to obtain the representative review excerpt from at least one of the plurality of reviews corresponding to the one of the plurality of categories identified from the ranking; and
generating, via at least one of the one or more computing devices, user interface data that comprises the representative review excerpt for rendering the user interface on a client device.

13. The method of claim 12, wherein the semantic analysis comprises at least one of: a latent dirichlet allocation, a latent semantic indexing, or a probabilistic latest semantic indexing.

14. The method of claim 12, wherein the representative review excerpt is a first one of a plurality of representative review excerpts, wherein the first one of the plurality of representative review excerpts is associated with a positive consumer sentiment and a second one of the plurality of representative review excerpts is associated with a negative consumer sentiment.

15. The method of claim 12, wherein the plurality of attributes are identified from the plurality of reviews based on a comparison of item data accessed from a data store with a lexicon used in the plurality of reviews.

16. The method of claim 15, wherein the item data is obtained from at least one of: formal product data, product category data, manufacturer description data, blog data, or discussion forum data.

17. The system of claim 6, wherein the one of the plurality of categories is identified from the ranking by:
determining that the one of the plurality of categories is ranked lower than the higher-ranked one of the plurality of categories in the ranking;
comparing a number of the plurality of reviews associated with the one of the plurality of categories to a number of the plurality of reviews associated with the higher-ranked one of the plurality of categories in the ranking to determine a review number difference; and
in response to the review number difference exceeding a threshold number, identifying the one of the plurality of categories instead of the higher-ranked one of the plurality of categories for use in obtaining the excerpt.

18. The system of claim 17, wherein the threshold number varies based at least in part on a difference in the ranking between the one of the plurality of categories identified and the higher-ranked one of the plurality of categories.

19. The method of claim 12, wherein the one of the plurality of categories is identified from the ranking by:
determining that the one of the plurality of categories is ranked lower the higher-ranked one of the plurality of categories in the ranking;
comparing a number of the plurality of reviews associated with the one of the plurality of categories to a number of the plurality of reviews associated with the higher-ranked one of the plurality of categories in the ranking to determine a review number difference; and
in response to the review number difference exceeding a threshold number, identifying the one of the plurality of categories instead of the higher-ranked one of the plurality of categories for use in obtaining the representative review excerpt.

20. The method of claim 19, wherein the threshold number varies based at least in part on a difference in the ranking between the one of the plurality of categories identified and the higher-ranked one of the plurality of categories.

* * * * *